Figure 1:
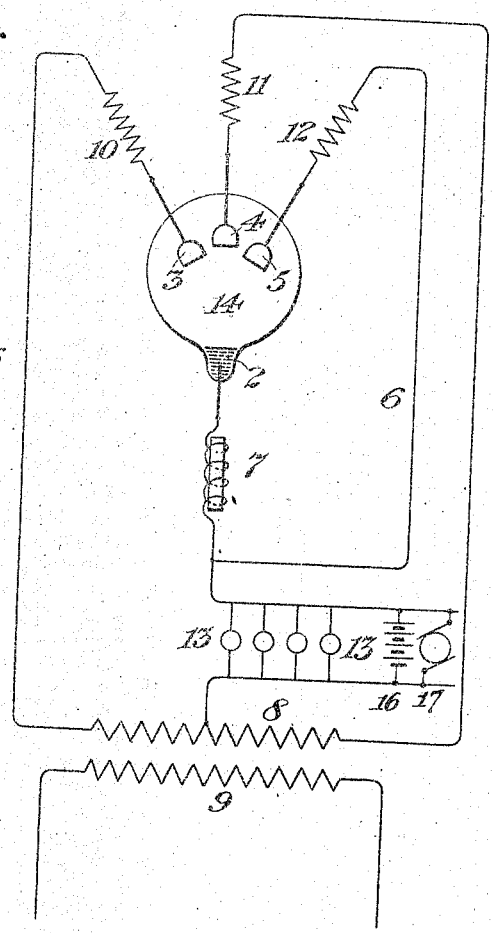

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR-CONVERTER AND CIRCUITS THEREFOR.

1,131,292.  Specification of Letters Patent.  Patented Mar. 9, 1915.

Application filed April 25, 1905, Serial No. 257,302. Renewed June 21, 1910. Serial No. 568,170.

*To all whom it may concern:*

Be it known that I, PERCY H. THOMAS, a citizen of the United States, and resident of Montclair, county of Essex, State of New Jersey, have invented certain new and useful Improvements in Vapor-Converters and Circuits Therefor, of which the following is a specification.

A method which is now common of keeping alive a single-phase vapor electric apparatus is that of causing the rectified current to pass through an inductance which is capable of storing energy and restoring a portion of the stored energy to the apparatus to prevent the cessation of current at the natural zero point of the generator. When this method of operation is employed, it is necessary that the choke oil should store a sufficient amount of energy during one alternation to continue the flow of current until it is again reinforced by the generator, and in so doing the choke oil or other inductance device must supply all the energy loss due to the flow of the rectified current. Any means which will reduce the amount of energy required to be stored, such as the lessening of ohmic resistance in a portion of this circuit will facilitate the operation of the device and introduce economy in the system. This result may be attained by providing a path for the passage of the current which is stored in the choke coil without traversing the full and natural circuit.

In the drawings which accompany and form a part of this specification I have illustrated diagrammatically two modes of keeping vapor electric apparatus alive under the conditions set forth above.

Figure 2:
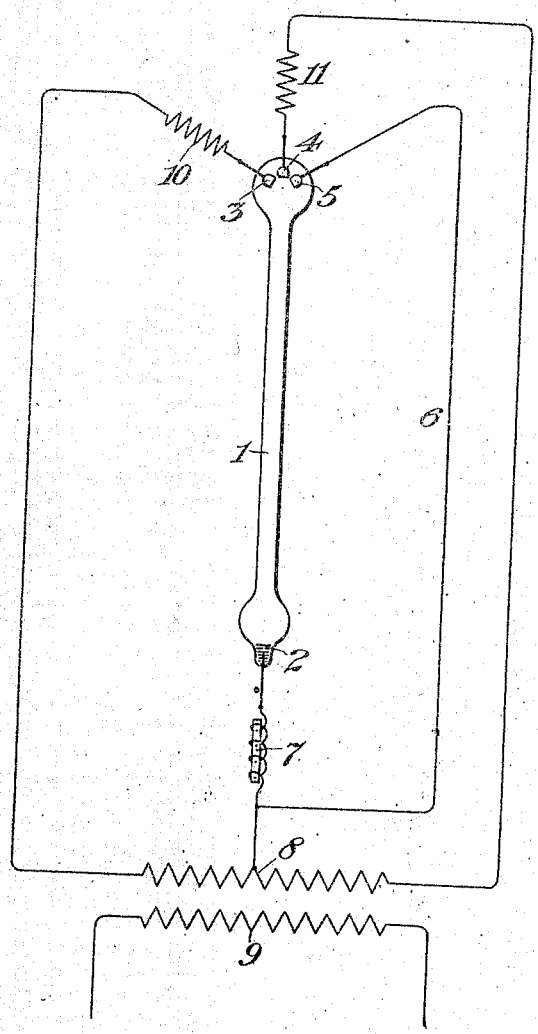

Figure 1 shows this method of keeping a vapor apparatus alive applied to a rectifier or converter, Fig. 2 shows its application to a vapor lamp. Fig. 3 shows a modification f Fig. 1.

In Fig. 2, for example, I have shown a vapor apparatus in the form of a vapor lamp, 1, having a negative electrode, 2, of mercury, and positive electrodes, 3 and 4, constituting the main positive electrodes of the apparatus. In addition to the electrodes 3 and 4 I provide a supplemental positive electrode, 5, which in the present instance is connected by a conductor, 6, to the circuit leading from the negative electrode 2. Interposed between the said electrode and the point where the conductor 6 joins the circuit leading from the electrode is a choke-coil, 7, while the conductor from the negative electrode is connected on the other side to an intermediate point of the secondary, 8, of a transformer whose primary is shown at 9. The terminals of the secondary are connected, one to the positive electrode 3 and the other to the positive electrode 4 through suitable resistance, 10, 11.

In the organization illustrated in Fig. 2 the supplemental positive electrode 5 is joined, as stated, to the terminal of the choke coil 7 which is not in connection with the negative electrode 2. Under these circumstances, while the choke coil is storing energy, its electro-motive-force is in such a direction as to be opposed in the shunt circuit by a temporary negative electrode resistance of the supplemental positive electrode. At the time of discharging energy, the electro-motive-force produced by the choke coil is in such a direction as to cause the supplemental positive electrode to act as a positive electrode for the current transmitted to the main negative electrode of the apparatus, thus maintaining a continuous flow of current in one direction through the device.

The described arrangement is often of very great advantage. There are instances, however, where the fact that so large a portion of the stored energy is withheld from the main work-circuit acts as a disadvantage. In such cases it is possible to pass a larger or smaller portion of the energy stored in the choke coil through the load and at the same time to pass enough energy through a by-path to prevent the total cessation of current in the negative electrode of the apparatus even though there be not sufficient energy originally stored in the choke coil to maintain through the whole period of insufficient supply a current through the work circuit. This result may be attained by means of an organization such as is illustrated in Fig. 1 where an ohmic resistance or impedance, 12, is introduced into the shunt circuit connected with the supplemental positive electrode. The action under these circumstances is clear from what has already been said.

In further explanation it may be noted that at the time of the gradual failure of the supply electro-motive-force the diminishing current is supported by the energy already stored in the inductance 7 which produces an electro-motive-force in such a direction as to continue the flow of current from the negative electrode. This electro-motive-force has a choice of two paths, one through the load which offers a certain resistance, the other through the shunt circuit 6, which also offers a different resistance; that is to say, the current passing through the inductance 7 will divide into two parts, the relative proportions of which are determined by the relative resistances of the two paths open to it. There is, however, this difference in the character of the resistance in the alternative paths,—the shunt is ohmic in its nature and the circuit containing the load may be of the nature of a counter electro-motive-force in which case it may force no current through this path. This may be explained as follows: The electro-motive-force supplied from the choke coil 7 together with any residual electro-motive-force from the source must exceed the counter electro-motive-force in the load, if any current is to flow in the load circuit. As, however, the same voltage is impressed upon the shunt circuit as upon the load circuit, current will flow over the shunt circuit up to the point that its resistance voltage plus any losses is equal to the voltage impressed upon the load branch. As the energy of the coil 7 becomes exhausted the current falls in value but the applied electro-motive-force remains approximately constant until the point is reached at which the current in the inductance coil 7 does not exceed the current taken by the shunt circuit when current immediately ceases in the load branch. The remaining energy of the choke coil 7 is thereafter discharged through the shunt circuit until charging begins again in virtue of the return of electro-motive-force from the supply. It is evident that this arrangement while being very suitable in many cases, involves the loss of a certain amount of stored energy in the resistance 12. This loss may be often avoided by the use of a choke coil instead of the resistance. This choke coil takes little or no current at the time of abundant storage of energy in the inductance 7 on account of its choking power, but gradually stores energy as the inductance is discharging and finally when the inductance has become nearly discharged the choke coil will restore its stored energy through the shunt circuit thus serving to maintain the apparatus alive. In consequence of the fact that during the charging of the choke coil 7 current will cease to flow through the choke coil in the shunt circuit, each cycle is a repetition of the cycle before, and no permanent current is established in the shunt. For example, such an arrangement is shown in Fig. 3 in which the choke coil 15 is inserted between the lead of the electrode 5 and the conductor 6. This choke coil 15 serves in a somewhat similar manner to the resistance 12 as just described.

In Fig. 2 the lamp 1 itself may be considered as constituting the major portion of the work circuit. In Fig. 1 I show a separate work circuit containing translating devices, 13, 13, the same being interposed between an intermediate point of the secondary 8 and the negative electrode 2. The translating device 1 shown in Fig. 2 is replaced in Fig. 1 by a vapor converter, 14.

I claim as my invention:—

1. A vapor electric apparatus provided with main positive electrodes, a common negative electrode, and a supplemental positive electrode, in combination with an alternating current source and circuits connecting the apparatus thereto, the said circuits including an inductance, and a shunt circuit including the said inductance and also including the common negative electrode, the supplemental positive electrode and an interposed impedance.

2. In a system of electrical distribution, the combination with a vapor rectifier including an hermetically sealed and completely exhausted container and a plurality of electrodes therein, one at least of which is a vaporizable reconstructing cathode, a work circuit and suitable connections therefor, of means for storing energy at times of abundant supply and a supplementary circuit including an auxiliary anode for discharging energy thus stored through the said container, and means in said last named supplementary circuit to divide the stored energy between the normal circuit and the supplementary circuit.

3. The combination with an alternating supply, an hermetically sealed and completely exhausted container, a plurality of anodes and a vaporizable reconstructing cathode therein, an inductance connected in the lead to the cathode and connections between said inductance and the source, of an impedance connected between an anode and that terminal of the inductance remote from that connected to the cathode.

4. In a system of electrical distribution, the combination with a vapor rectifier, including an exhausted container, a plurality of anodes and a vaporizable reconstructing cathode therein, a work circuit having a counter-electro-motive-force and suitable connections between these parts including an alternating electric supply, of means for storing electrical energy, said means being electrically adjacent the negative electrode and a circuit in shunt to said storage means and the negative electrode, said circuit including an anode in said rectifier, and means located in said shunt circuit adapted to cause the energy stored at times of abundant supply to divide between the normal circuit and the shunt circuit while this energy exceeds a certain minimum.

5. The combination with an alternating supply, an hermetically sealed and completely exhausted container, a plurality of anodes and a vaporizable reconstructing cathode, therein, an inductance connected in the lead to the cathode and connections between said inductance and the source, of a resistance connected between an anode and that terminal of the inductance remote from that connected to the cathode.

Signed at New York, in the county of New York, and State of New York, this 21st day of April, A. D. 1905.

PERCY H. THOMAS.

Witnesses:
WM. H. CAPEL,
THOS. H. BROWN.